(12) United States Patent
Liu et al.

(10) Patent No.: US 10,872,295 B1
(45) Date of Patent: Dec. 22, 2020

(54) RESIDUAL QUANTIZATION OF BIT-SHIFT WEIGHTS IN AN ARTIFICIAL NEURAL NETWORK

(71) Applicant: Hong Kong Applied Science and Technology Research Institute Company, Limited, Hong Kong (HK)

(72) Inventors: Yu Liu, Hong Kong (HK); Xuejiao Liu, Shenzhen (CN); Luhong Liang, Hong Kong (HK)

(73) Assignee: Hong Kong Applied Science and Technology Institute Company, Limited

( * ) Notice: Subject to any disclaimer, the term of this patent is extended or adjusted under 35 U.S.C. 154(b) by 0 days.

(21) Appl. No.: 16/575,421

(22) Filed: Sep. 19, 2019

(51) Int. Cl.
    *G06N 3/063*    (2006.01)
    *G06F 7/544*    (2006.01)

(52) U.S. Cl.
    CPC ........... *G06N 3/063* (2013.01); *G06F 7/5443* (2013.01)

(58) Field of Classification Search
None
See application file for complete search history.

(56) References Cited

U.S. PATENT DOCUMENTS

| | | | |
|---|---|---|---|
| 6,125,348 | A | 9/2000 | Levine |
| 7,730,118 | B2 | 6/2010 | Kurd |
| 10,089,577 | B2 | 10/2018 | Umuroglu |
| 2016/0086078 | A1 | 3/2016 | Ji et al. |
| 2017/0243110 | A1 | 8/2017 | Esquivel et al. |
| 2018/0232621 | A1 | 8/2018 | Du et al. |
| 2018/0307950 | A1 | 10/2018 | Nealis et al. |
| 2018/0314940 | A1 | 11/2018 | Kundu et al. |

FOREIGN PATENT DOCUMENTS

| | | |
|---|---|---|
| CN | 105760933 A | 7/2016 |
| CN | 106779050 A | 5/2017 |
| CN | 108647779 A | 10/2018 |
| CN | 110210621 A | 9/2019 |

OTHER PUBLICATIONS

Walsh, Design and Implementation of Massively Parallel Fine-Grained Processor Arrays, Doctoral Thesis, University of Manchester, 2014, pp. 1-207 (Year: 2014).*
ISR and Written Opinion, PCT/CN2019/111276, dated Jun. 18, 2020.

* cited by examiner

*Primary Examiner* — Wilbert L Starks
(74) *Attorney, Agent, or Firm* — Stuart T. Auvineng Patent LLC

(57) ABSTRACT

A neural network accelerator reads encoded weights from memory. All 1 bits in a weight except the first three are discarded. The first three leading 1 bits in the weight are encoded as three bit-shift values to form the encoded weight. The three bit-shift values are applied to a bit shifter to shift a node input to obtain three shifted inputs that are accumulated to generate the node output. Node complexity is reduced since only 3 shifts are performed rather than up to 15 shifts for a 16-bit weight. The bit shifter and accumulator for a node can be implemented by Look-Up Tables (LUTs) without requiring a Multiply-Accumulate (MAC) cell in a Field-Programmable Gate Array (FPGA). Quantization bias is reduced using a histogram analyzer that determines a weighted average for each interval between quantized weights. The third bit-shift value is incremented for weights in the interval above the weighted average.

20 Claims, 12 Drawing Sheets

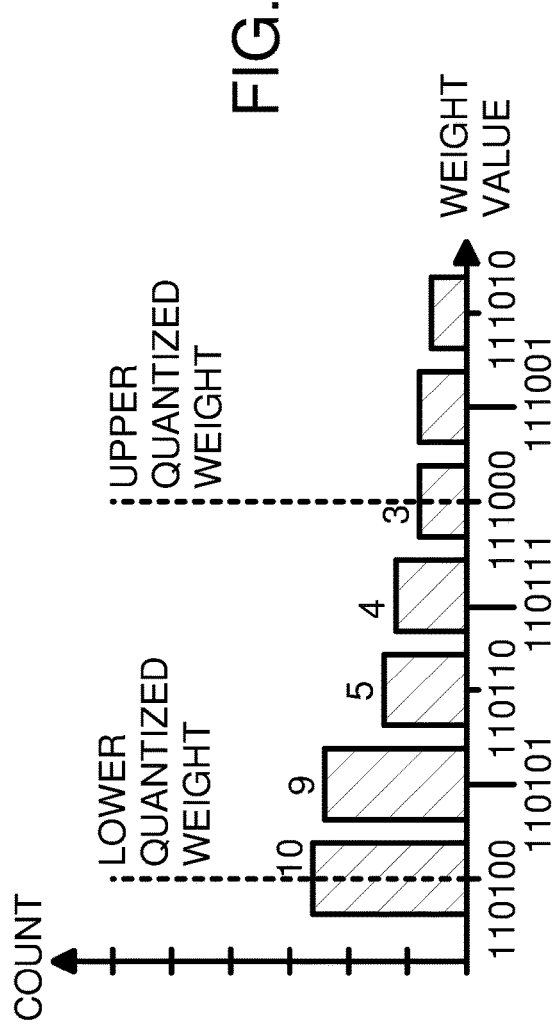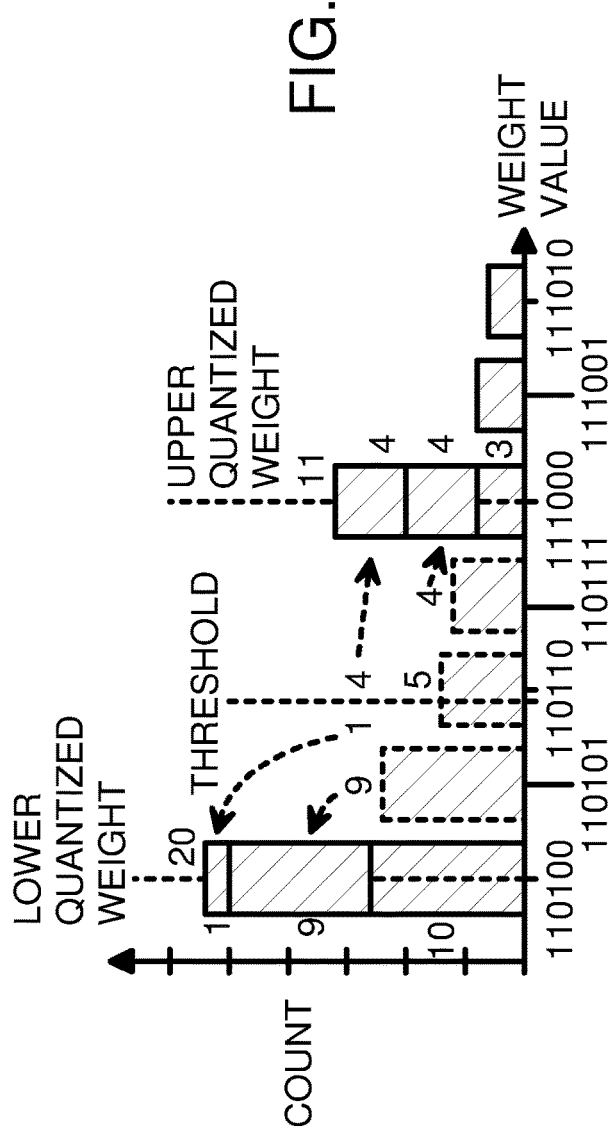

US 10,872,295 B1

RESIDUAL QUANTIZATION OF BIT-SHIFT WEIGHTS IN AN ARTIFICIAL NEURAL NETWORK

FIELD OF THE INVENTION

This invention relates to neural networks, and more particularly for optimization of bit-shift neural networks.

BACKGROUND OF THE INVENTION

Artificial Neural Networks are especially useful for processing large amounts of data in complex ways that are hard to define using traditional computer programs. Instead of being programmed with instructions, training data is input to a neural network and compared to the expected output, then adjustments are made within the neural network and the training data is again processed and outputs compared to generate further adjustments to the neural network. After many such training cycles, the neural network is altered to efficiently process data similar to the training data and expected outputs. Neural networks are an example of machine learning, since the neural network learns how to generate the expected outputs for the training data. Real data similar to the training data can then be input to the neural network to process live data.

FIG. 1 illustrates a prior art neural network. Input nodes 102, 104, 106, 108 receive input data $I_1, I_2, I_3, \ldots I_4$, while output nodes 103, 105, 107, 109 output the result of the neural network's operations, output data $O_1, O_2, O_3, \ldots O_4$. Three layers of operations are performed within this neural network. Nodes 110, 112, 114, 116, 118, each take inputs from one or more of input nodes 102, 104, 106, 108, perform some operation, such as addition, subtraction, multiplication, or more complex operations, and send and output to nodes in the second layer. Second-layer nodes 120, 122, 124, 126, 128, 129 also receive multiple inputs, combines these inputs to generate an output, and sends the outputs on to third-level nodes 132, 134, 136, 138, 139, which similarly combine inputs and generate outputs.

The inputs at each level are typically weighted, so weighted sums (or other weighted operation results) are generated at each node. These weights can be designated $W_{31}, W_{32}, W_{32}, W_{33}, \ldots W_{41}$, etc., and have their values adjusted during training. Through trial and error or other training routines, eventually higher weights can be given for paths that generate the expected outputs, while smaller weights assigned to paths that do not generate the expected outputs. The machine learns which paths generate the expected outputs and assigns high weights to inputs along these paths.

These weights can be stored in weights memory 100. Since many neural networks have many nodes, there may be many weights to store in weights memory 100. Each weight may require multiple binary bits to represent a range of possible values for that weight. Weights often require 8 to 16 bits. The size of weights memory 100 often scales with the overall size and complexity of the neural network.

Deep neural networks have many layers of nodes and are often used for applications such as object classification, speech recognition, sentiment analysis, image recognition, facial detection, and other graphics processing. FIG. 2 shows a neural network used for facial recognition. Image input 10 may be extracted from a larger image, such as by software that isolates the faces of people. Feature extractor 15 performs low-level feature extraction, pooling, and down-sampling. For example, facial features such as eyes and mouths can be identified and extracted as extracted features 12. These extracted features 12 are pooled and down sampled to generate outputs 14.

Mid-level feature connector 17 examines the down sampled extracted features and generates connections 16 and mid-level features 18 which can then be used to generate high-level features 19. Classifier 20 classifies and fully connects the features so that the facial features can be output. Such facial detection may by implemented using a neural network with 10 layers with many nodes. Over 100 million weights are used by the neural network.

FIG. 3 shows a neural network implementing an image recognition processor. Input image 10 may contains many features, such as several people, background and foreground objects, and several frames. Various layers of the neural network perform 64-bit convolutions 22, 256-bit convolutions 26, and 512-bit convolutions 28. The most responsive nodes are generated by maxpooling layers 24, while final softmax layer 30 performs a normalized exponential function to limit the output range. Fully Connected FC layers 32 perform high-level reasoning by allowing each node to look at all inputs in a previous layer.

Such image processing may require 16 hidden layers in a neural network and have over 200 Million weights. Thus, the required size for weights memory 100 ((FIG. 1) is quite large. It is desirable to reduce the size of the weights without significantly sacrificing accuracy.

FIG. 4 shows training a neural network. Neural network 36 receives training data 34 and a current set of weights and operates on training data 34 to generate a result. The generated result from neural network 36 is compared to target data 38 by loss function 42, which generates a loss value that is a function of how far the generated result is from the target. The loss value generated by loss function 42 is used to adjust the weights applied to neural network 36. Many iterations of weights may be applied by loss function 42 onto training data 34 until a minimum loss value is identified, and the final set of weights used.

FIG. 5 shows a neural network accelerator. While a neural network can be implemented using general-purpose Central Processing Units (CPUs) or Graphics Processing Units (GPUs), special neural-network accelerators are becoming available. Some neural network accelerators use field-programmable gate arrays (FPGA). Such FPGA's may be made available to various users as a paid service, such as FPGA-as-a-Service (FaaS).

FPGA 160 is one or more FPGA devices that can be programmed to operate as a neural network accelerator. FPGA 160 has many instances of Look-Up Table (LUT) 156 that can be loaded with values and implement various simple logical functions. FPGA 160 also contains many instances of digital-signal processor (DSP) blocks 150, each with multiplier 152 and accumulator 154. DSP blocks 150 are useful for implementing more complex logic functions, such as multi-bit additions and other mathematical functions.

When programmed for use as a neural network accelerator, DSP blocks 150 tend to be fully allocated, while LUT 156 are under-utilized. For example, only 40% of LUT 156 may be used, while 60% of LUT 156 are idle when implementing a neural network. In particular, the nodes in a neural network multiply node inputs by weights and sum the results to generate node outputs. These Multiply-Accumulate (MAC) operations are better suited for DSP blocks 150 than LUT 156. Optimizing and conversion programs may be able to convert some of the MAC operations for implementation on LUT 156, but the hardware usage costs are high since many LUT 156 may be needed to convert an operation that could be performed by one DSP block 150.

It is desirable to more efficiently convert LUT 156 for MAC operations. It is desired to more efficiently use LUT 156 resources in an FPGA. It is desirable to use idle LUT resources in an FPGA to implement small-scale MAC operations. It is desired to limit the number of shift and add operations to improve computational efficiency so that LUT resources may be used rather than DSP resources for some operations in a neural network. It is desired to maintain the precision of the original neural network model while limiting shift and add operations to allow these limited operations to be implement by LUT rather than requiring DSP blocks.

BRIEF DESCRIPTION OF THE DRAWINGS

FIGS. 9A-9B show histogram analysis.

DETAILED DESCRIPTION

The present invention relates to an improvement in neural network accelerators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

The inventors have realized that each node in a neural network multiplies a weight by an input, and sums these results for all inputs to that node to generate the node output. The multiply of the weight can be implemented as a series of shifts that are accumulated. For a 16-bit weight, there can be up to 16 shifts.

Rather than perform all 16 shifts, the inventors perform no more than 3 of these shifts. No more than the 3 most-significant 1's in the weight are encoded as shifts, while less-significant 1's are discarded as an approximation.

Computational complexity is greatly reduced, since a worst-case 16 shifts are reduced to 3 shifts. Precision is improved by rounding the $3^{rd}$ shift up or down. A rounding directional bias is obtained by a histogram analysis.

Figure 6:
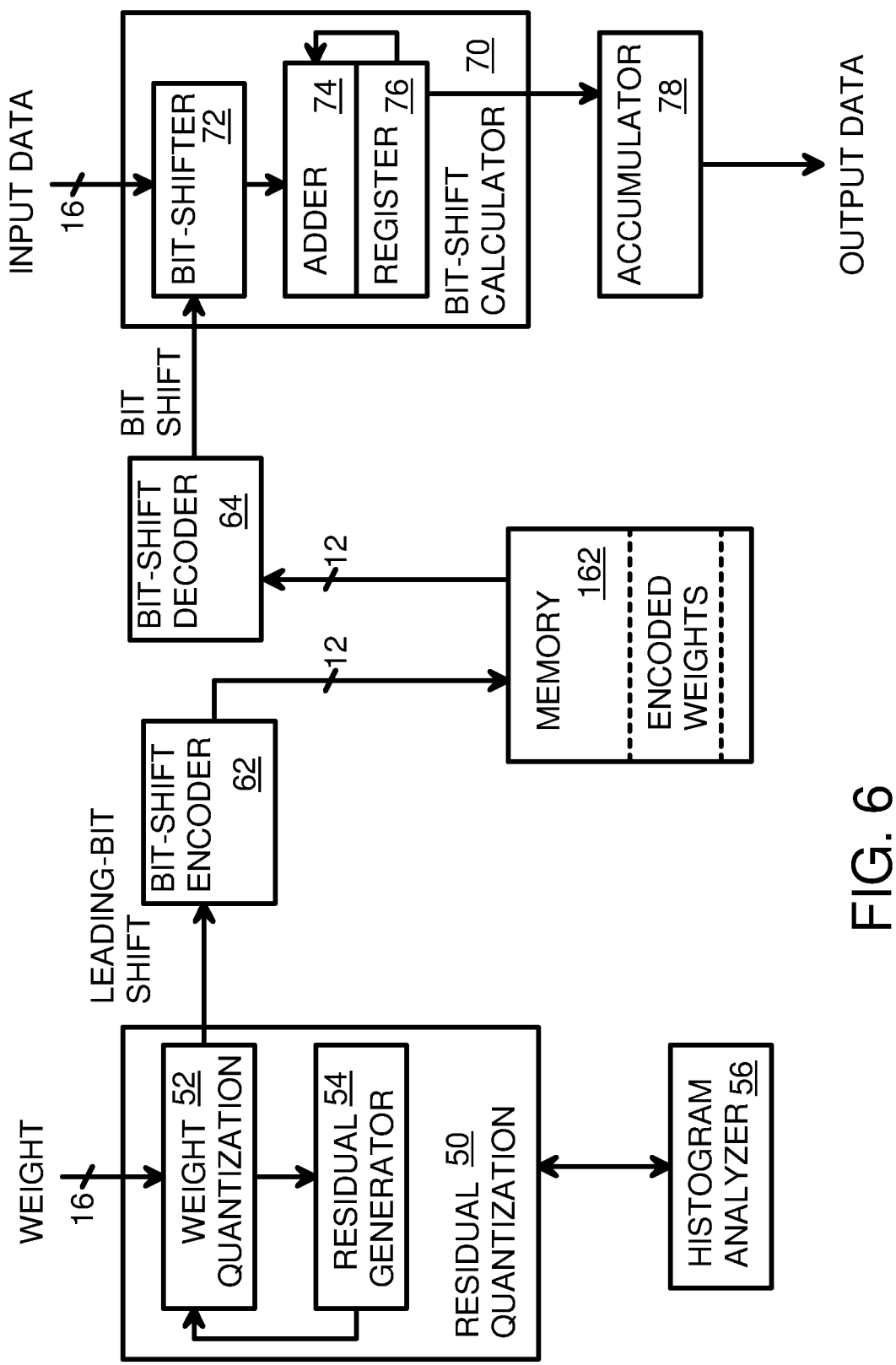
FIG. 6 is a diagram of a bit-shift neural network with weights that are encoded as bit shifts using residual quantization.

FIG. 6 is a diagram of a bit-shift neural network with weights that are encoded as bit shifts using residual quantization. Memory 162 stores 12-bit encoded weights that are encoded from 16-bits weights by residual quantizer 50 and bit-shift encoder 62. Since 12-bit encoded weights, rather than the full 16-bit weights are stored in memory 162, memory size is reduced by 25%.

Bit-shift decoder 64 reads the encoded weight from memory 162 and decodes it into three-bit shift values. These decoded bit shift values are successively applied to bit shifter 72 to shift the input data. The three shifted input weights are added by adder 74 and accumulated in register 76 in bit-shift calculator 70. Once the three shifted input values are accumulated in register 76, the result is added by accumulator 78 to the results for other inputs and weights for this node. Once results for all inputs to this node have been accumulated, and the final output for this node read from accumulator 78.

The 16-bit weight is initially quantized by weight quantizer 52 to obtain the first bit-shift value. Then the residual generated by residual generator 54 is quantized by weight quantizer 52 to obtain the second bit-shift value. Finally, the second residual generated by residual generator 54 is quantized by weight quantizer 52 to obtain the third bit-shift value. Histogram analyzer 56 adjusts rounding thresholds that are used by residual quantizer 50 to round the third bit-shift value up or down. These three bit-shift values are then encoded by bit-shift encoder 62 and the encoded weight stored in memory 162.

Figure 7:
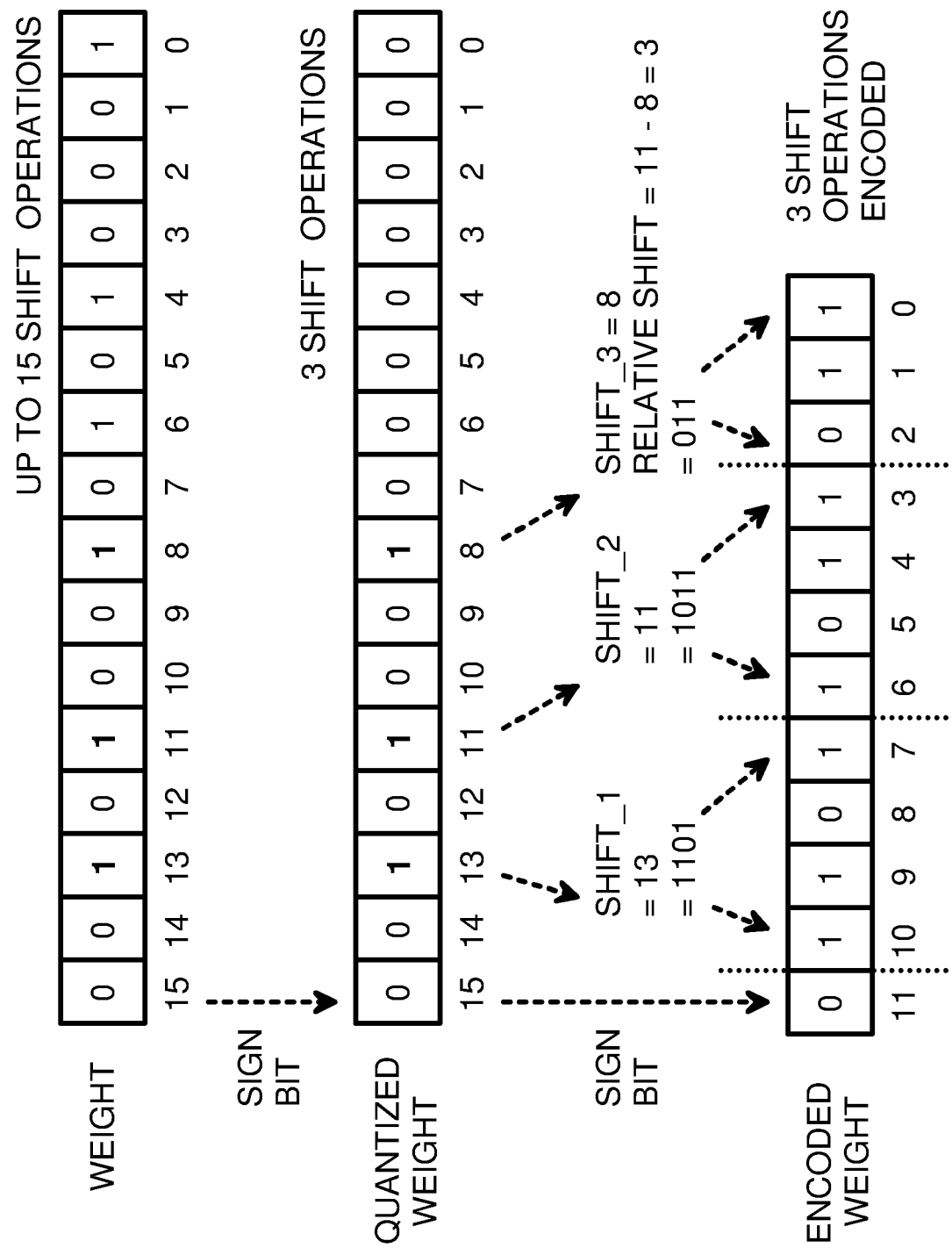
FIG. 7 shows encoding a weight as bit-shift values.

FIG. 7 shows encoding a weight as bit-shift values. A 16-bit weight has a sign bit at bit-position 15, and binary data bits at the other 15 bit-positions 14:0. If all of these 15 bit-positions were 1, then the weight would require 15 shift operations on the input data by the neural network node to multiply the input data by the weight.

For the example weight value 0010100101010001, there is a 13-bit shift, a 11-bit shift, a 8-bit shift, a 6-bit shift, a 4-bit shift, and a 0-bit shift of the input data, and the results from these 6 shifts are added together to get the multiply result. However, smaller shifts have a smaller impact on the overall result since these are Least-Significant-Bits (LSBs) of the weight. The Most-Significant-Bits (MSBs) of the weight have a much larger impact on the final result. Thus, the inventors encode only the first three MSB shifts, and discard the remaining LSB shifts.

In this example, bits 13, 11, and 8 are the MSB's of the weight. The quantized weight has no more than three 1's, in bit-positions 13, 11, and 8. Thus the quantized weight is 0010100100000000.

The bit-positions of these 3 leading ones are encoded as shift values SHIFT_1, SHIFT_2, and SHIFT_3. The first shift value, SHIFT_1, is 13, which is encoded as 1101. The second shift value, SHIFT_2, is 11, which is encoded as 1011. The third and final shift, SHIFT_3, is 8. Since the sign bit occupies the leading position of the encoded weight, there are only 3 bits remaining that are available to encode the third shift. To accommodate the limited remaining bits in the encoded weight, the third shift is encoded as a relative shift value, relative to the second shift. In this example the relative shift value is SHIFT_2 SHIFT_3, (11-8), or 3. The third shift is encoded as 011.

The encoded weight is a 12-bit value with two 4-bit fields for the first and second shifts, and a 3-bit field for the third shift, plus a sign bit. The first and second shifts are encoded as absolute shift values, while the third shift is encoded as a relative shift value. The original 16-bit weights are compressed to 12-bit encoded weights, requiring 25% less memory storage space.

A zero value for bits 2:0 can be used to indicate that the third shift is not needed. When the original weight is zero, then bits 10:7 can be set to 1111, which is an invalid shift amount. Alternately, all bits in the encoded weight could be set to 0. Since there are only 3 bits to encode the third shift value, the third shift is limited to be within 7 bit positions of the second shift. When the original weight has a third shift that is more than 7 bit positions from the second shift value, then the third shift is discarded.

Figure 8:
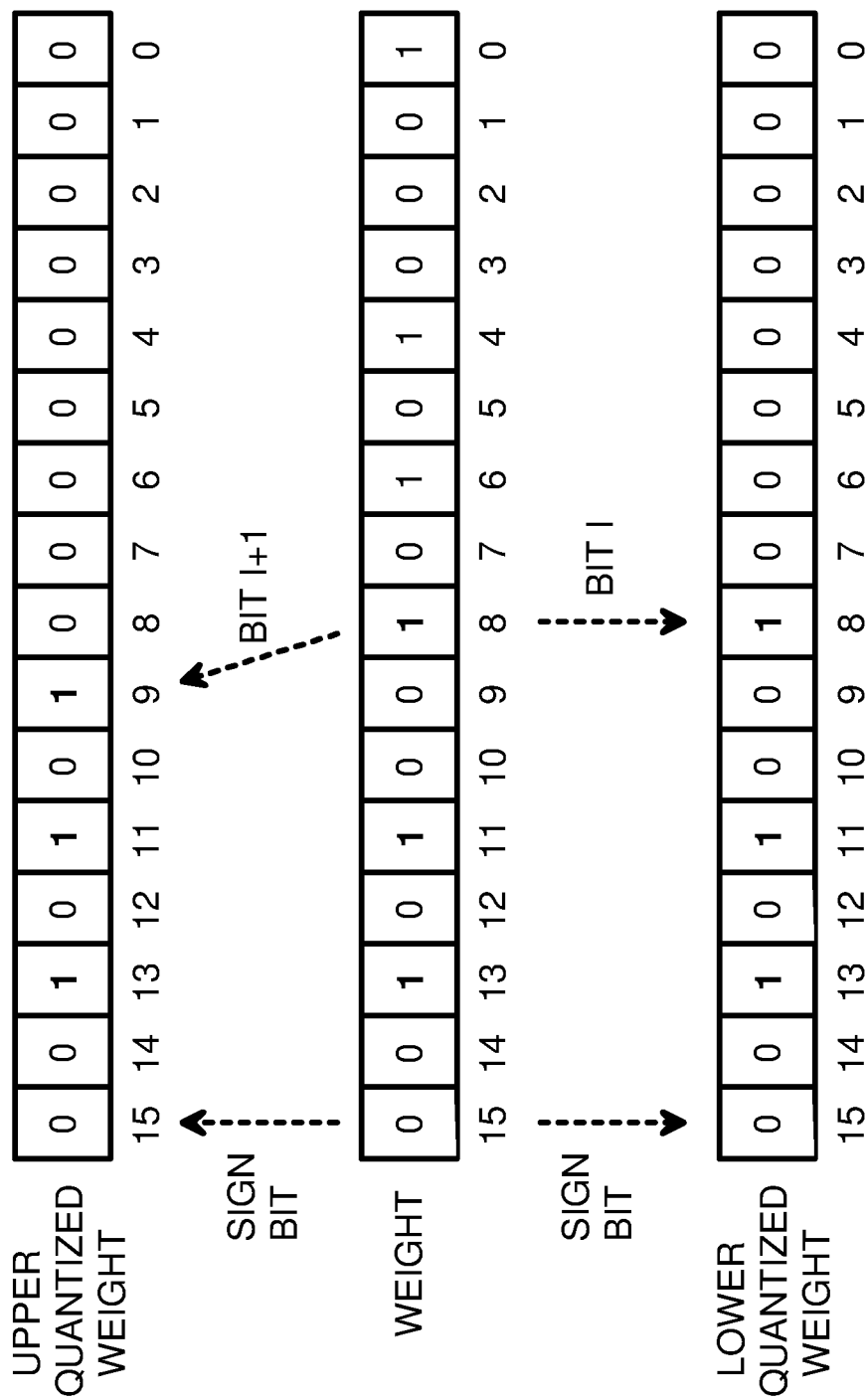
FIG. 8 highlights quantization direction for the third shift value.

FIG. 8 highlights quantization direction for the third shift value. The third shift value can be quantized to the lower quantized weight (rounded down) or can be quantized to the upper quantized weight (rounded up). The third shift value is increased by one bit-position to obtain the upper quantized weight.

Histogram analyzer 56 counts the number of weights in a channel that are in the interval between the upper and lower quantized weights, and assigns a threshold count, which can be half of the number of weights in the channel/interval as a simple example. The smallest weights for this interval are assigned to the lower quantized weight, while the larger weights for this interval are assigned to the upper quantized weight, with the threshold count being the number of weights assigned to the lower quantized weight.

FIGS. 9A-9B show histogram analysis. FIG. 9A is a histogram of weight values in an interval. The interval has a lower quantized value of 110100 and an upper quantized value of 111000. Other weight values within this interval have more than three 1 bits, and must be rounded up or down to have no more than three 1 bits for bit-shift encoding.

There are 9 weights with a value of 110101, 5 weights of value 110110, and 4 weights of value 110111 that are within this interval, for a total of 18 weights. Histogram analyzer 56 counts these weights within this interval and generates a threshold count. The threshold could be exactly half (9), but in this example it is set at 10, because there are 9 weights with a value of 110101, but only 4 weights of value 110111, so the interval is not evenly populated with weights but has a bias toward the lower quantized value.

In FIG. 9B, the lower-value weights in the interval, up to the threshold count, are assigned to the lower quantized weight. The 9 weights with a value of 110101 are rounded down to 110100, and one of the 5 weights of value 110110 is also rounded down to 110100, for a total of 10 weights that are rounded down.

The remaining 4 weights of value 110110 are rounded up to 111000, as are the 4 weights of value 110111. Thus 8 weights are rounded up to the upper quantized value of 111000, while 10 weights are rounded down to the lower quantized value of 1110100.

Figure 10:
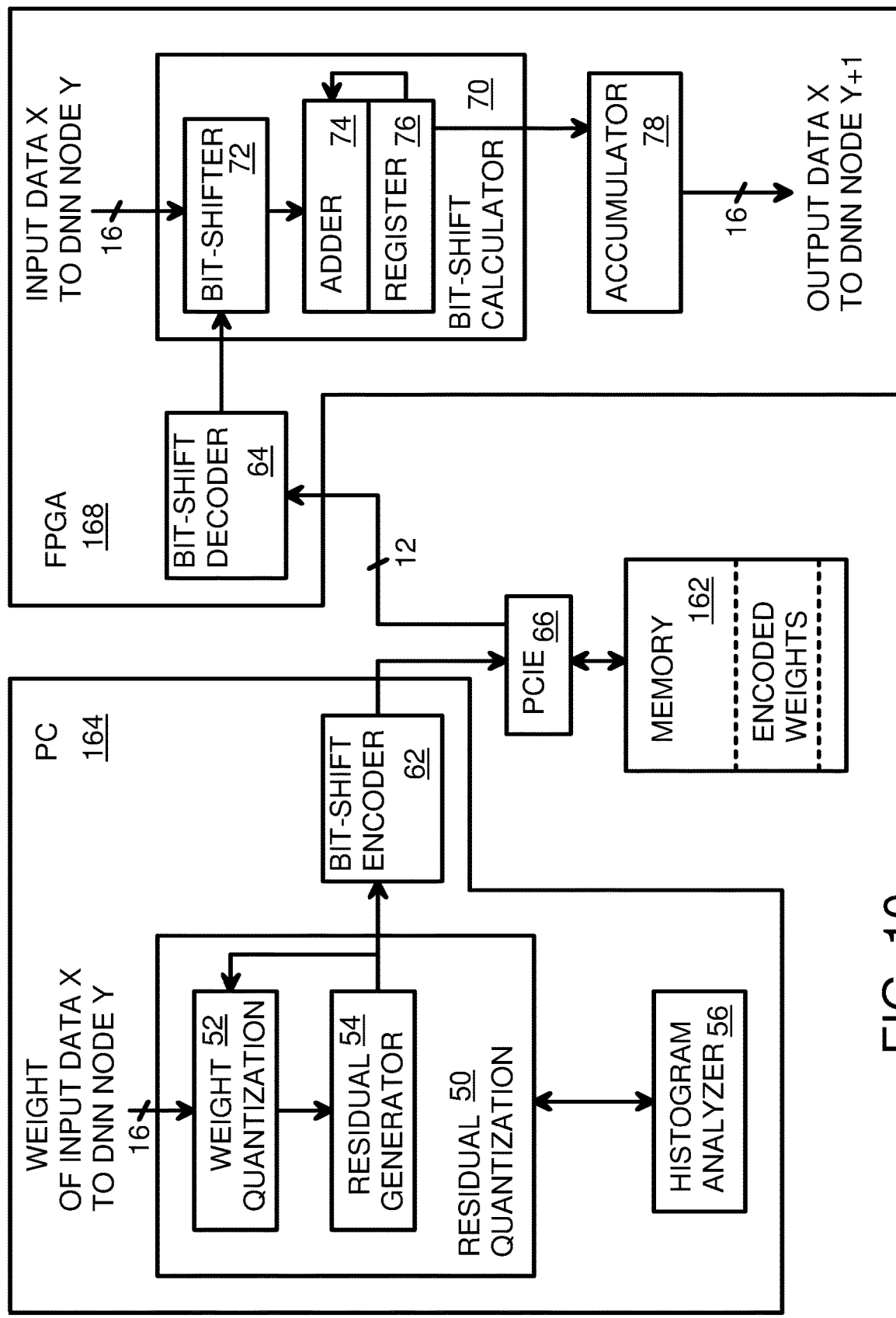
FIG. 10 is a bit-shift neural network system using a host computer to load encoded weights for use by a FPGA accelerator.

FIG. 10 is a bit-shift neural network system using a host computer to load encoded weights for use by a FPGA accelerator. FPGA 168 is one or more FPGA chips that perform neural network node operations of multiplying encoded weights by inputs to obtain outputs for each node. The encoded weight is read from memory 162 through Peripheral Component Interconnect express (PCIe) interface 66, and the 12-bit encoded weight is decoded by bit-shift decoder 64 to three bit-shift values. Bit-shift calculator 70 is implemented in many nodes as one or more LUT in FPGA 168, reducing the usage of DSP blocks in FPGA 168.

The decoded first shift value from bit-shift decoder 64 is applied to bit shifter 72 to shift the input data to the node by the first shift value number of bits, and the shifted result is stored in register 76 through adder 74. The decoded second shift value from bit-shift decoder 64 is likewise applied to bit shifter 72 to shift the input data to the node by the second shift value number of bits, and the shifted second result is added by adder 74 to the shifted first result stored in register 76 and thus accumulated into register 76. Finally the decoded third shift value from bit-shift decoder 64 is likewise applied to bit shifter 72 to shift the input data to the node by the third shift value number of bits, and the shifted third result is added by adder 74 to the shifted first and second result accumulated in register 76 and thus accumulated into register 76.

When the decoded third shift value is a relative shift rather than an absolute shift, the shifted second result can be input to bit shifter 72, or can remain in bit shifter 72 after the second shift operation, and then bit shifter 72 shifts the shifted second result by the relative third shift value, rather than shift the node input.

Shifting the input by the encoded weights is performed for other inputs of this node (not shown) and accumulated into node accumulator 78 before generating the node output as a 16-bit value to downstream nodes in the neural network.

Host personal computer (PC) 164 can be programmed to implement residual quantizer 50 and histogram analyzer 56. The weights are quantized by weight quantizer 52 and the leading one bit's position is encoded as a bit-shift value by bit-shift encoder 62. Then residual generator 54 removes the leading one bit and the residual is processed by weight quantizer 52 and the second bit-shift value is generated for the bit-position of the next leading 1 in the residual, and the second bit-shift value is encoded by bit-shift encoder 62. Finally, the two leading one bits are removed by residual generator 54 and weight quantizer 52 locates the next leading-one bit position to generate the third bit-shift value. The third bit-shift value is increased by one for upper directional bias when necessary, and then encoded as a relative shift value by bit-shift encoder 62. The three bit-shift values from bit-shift encoder 62 are stored into memory 162 through PCIe interface 66.

Figure 4:
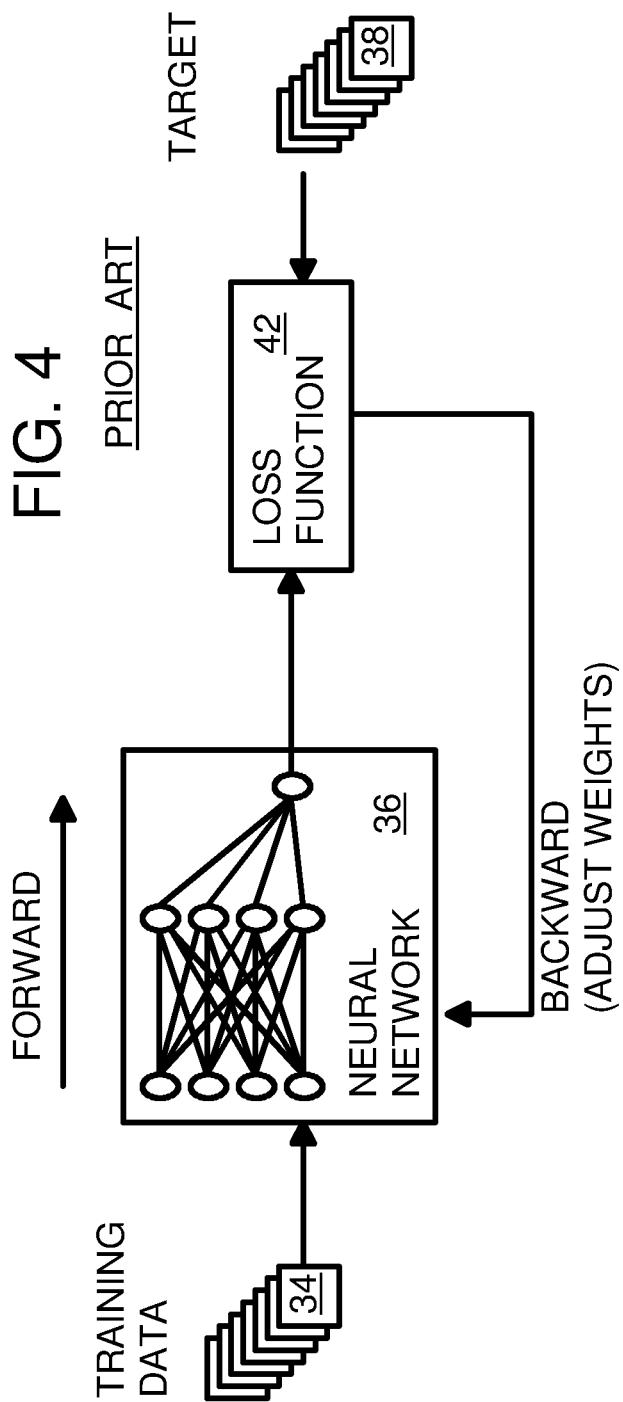
FIG. 4 shows training a neural network.
Figure 5:
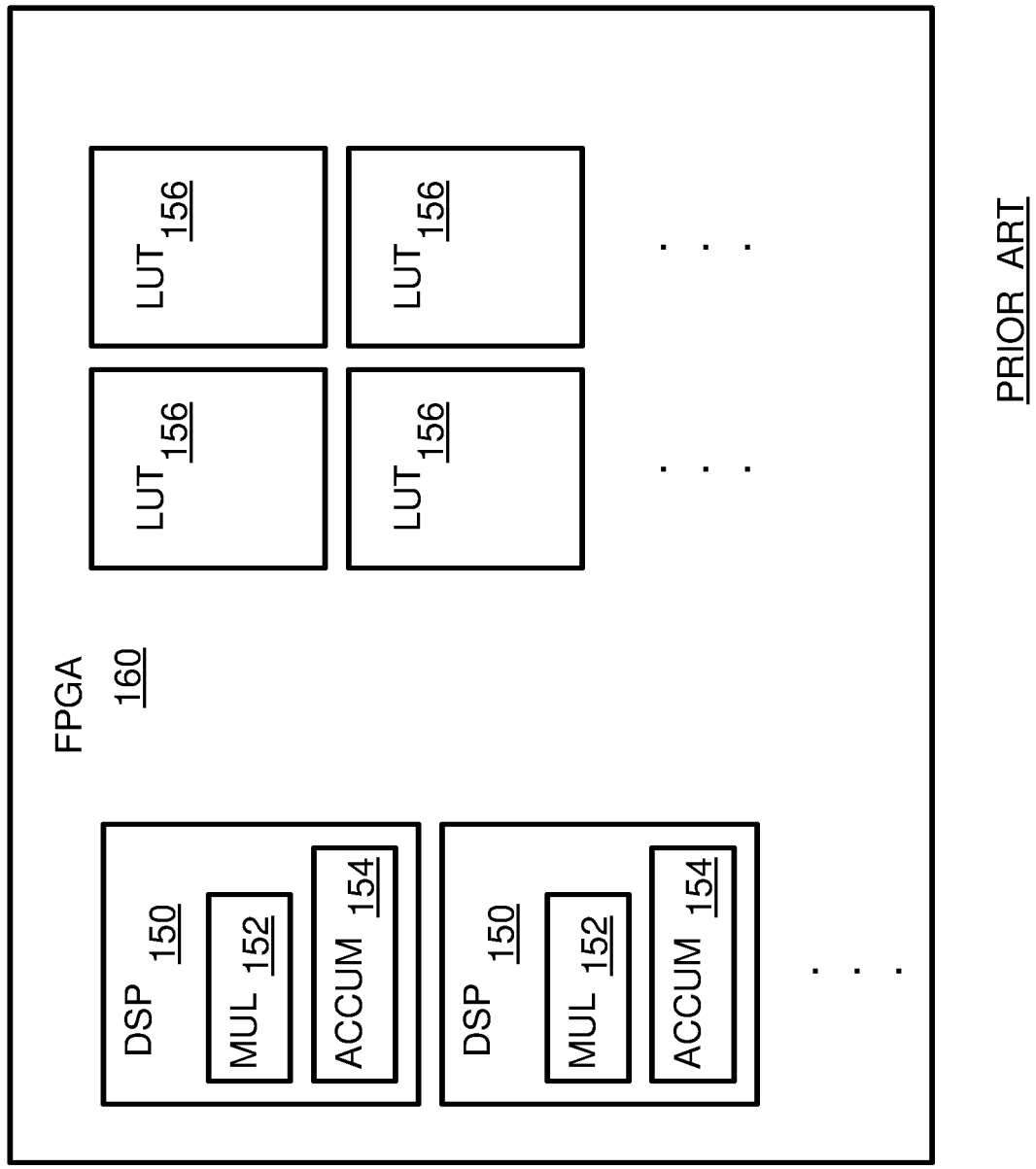
FIG. 5 shows a neural network accelerator.

During training, the weights are adjusted until the error or loss function reaches an acceptable level (FIG. 4). Then the weights are frozen and can be read directly from memory 162 and decoded by bit-shift decoder 64 for use in FPGA 168. Thus, after neural network training is completed, host PC 164 is no longer needed, and the neural network can operate more quickly since only FPGA 168 is running, not host PC 164.

Figure 1:
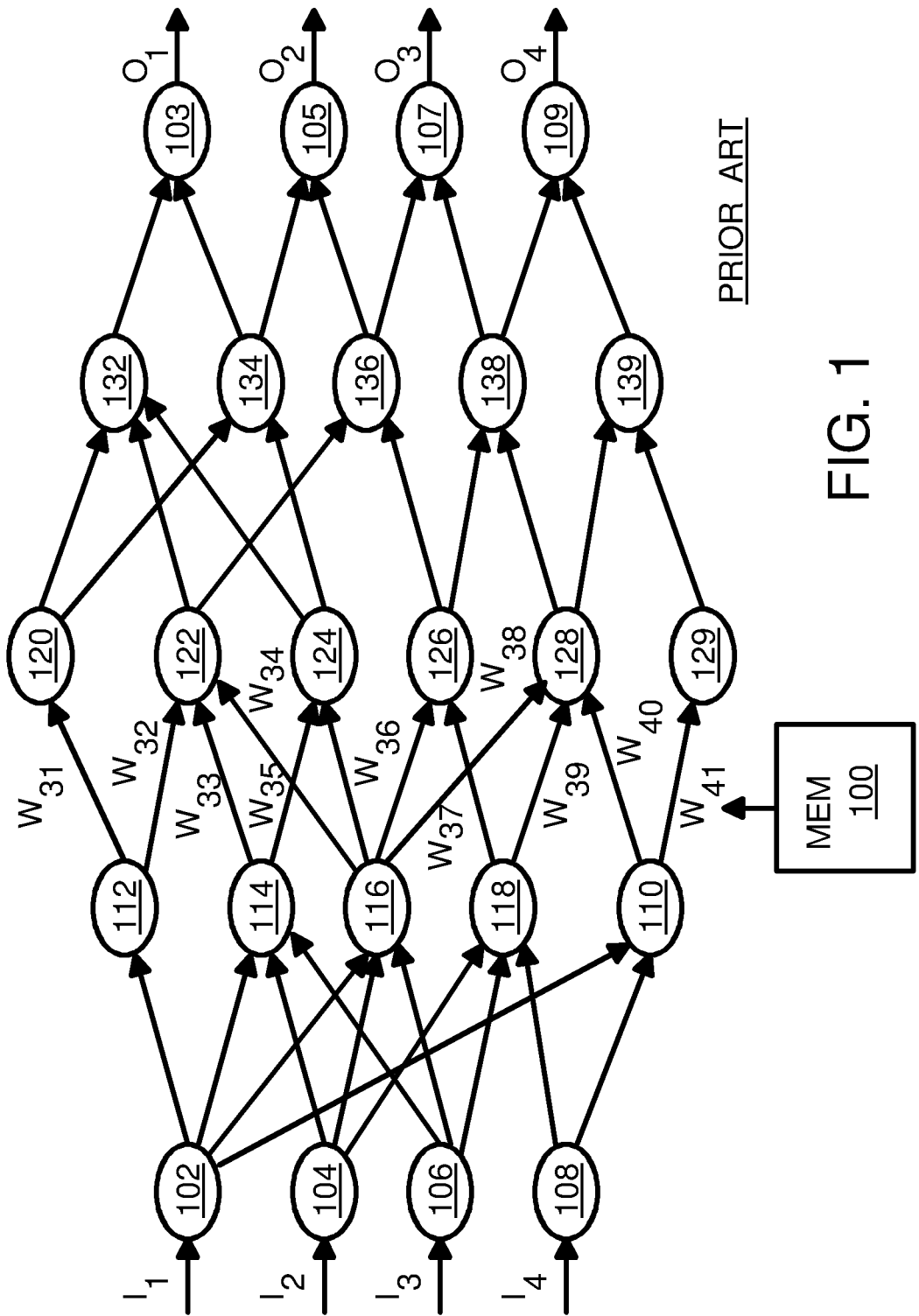
FIG. 1 illustrates a prior art neural network.
Figure 2:
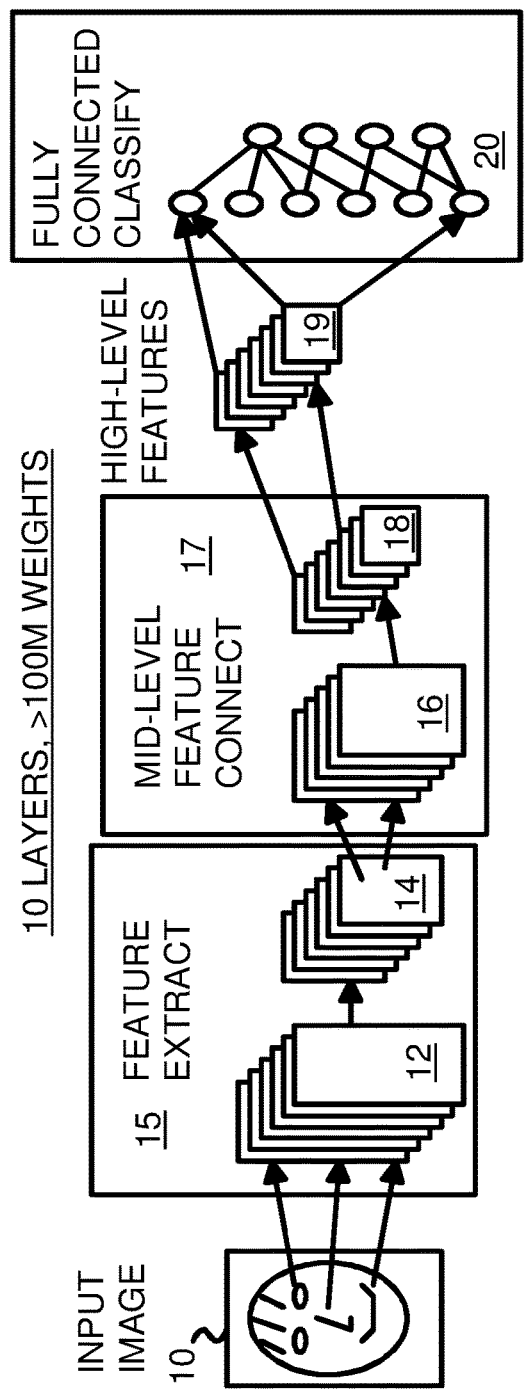
FIG. 2 shows a neural network used for facial recognition.
Figure 3:
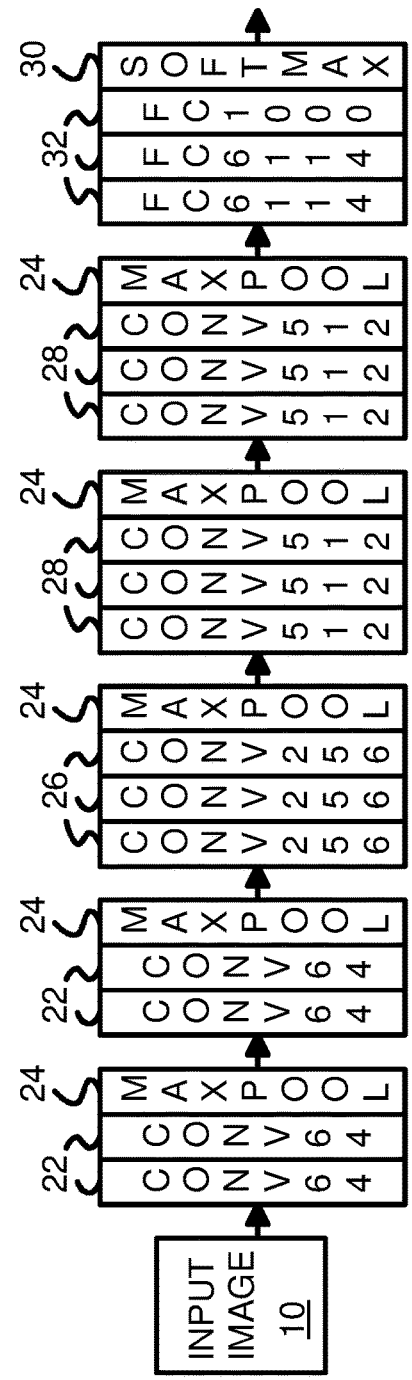
FIG. 3 shows a neural network implementing an image recognition processor.
Figure 11:
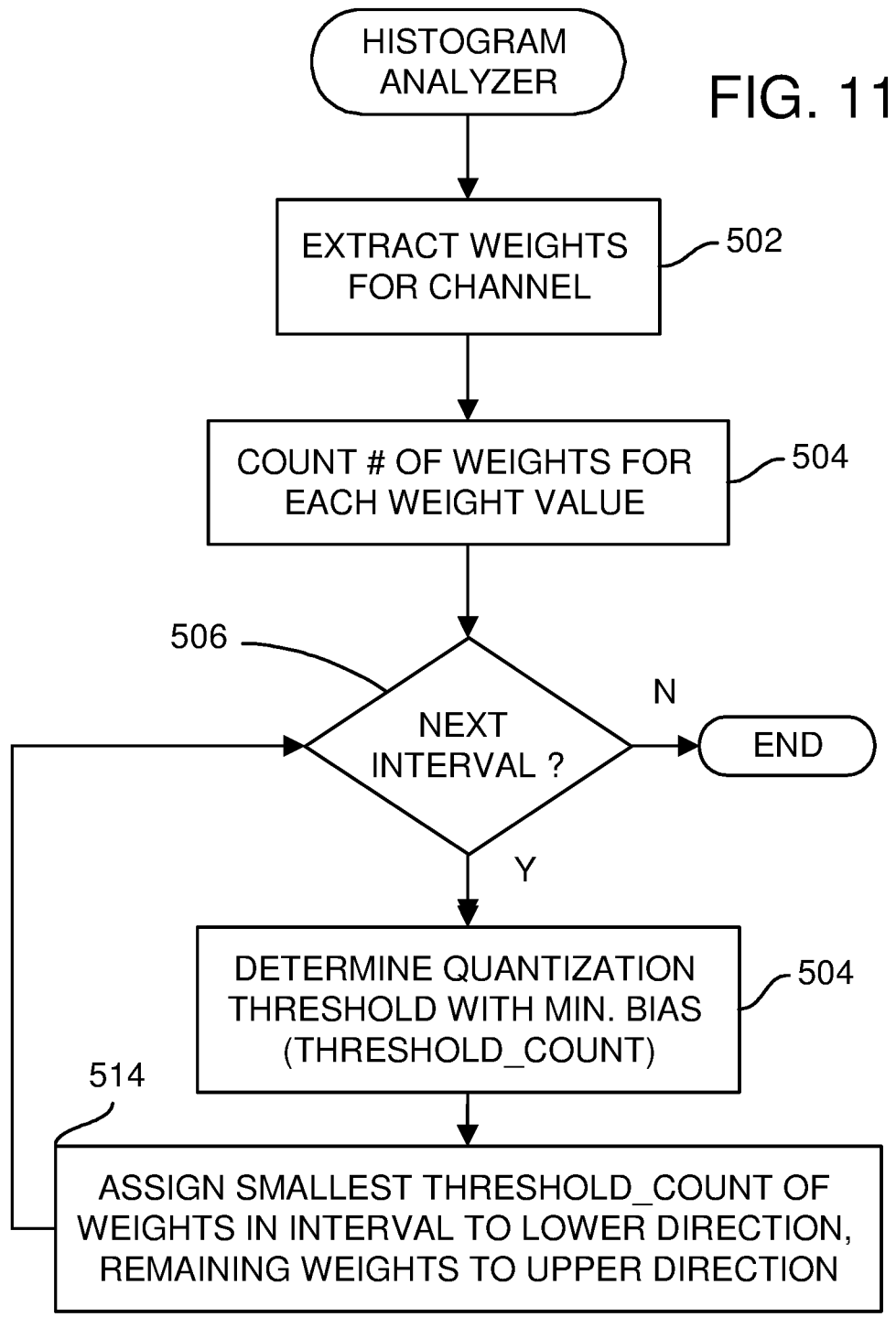
FIG. 11 is a flowchart of operation of the histogram analyzer.

FIG. 11 is a flowchart of operation of the histogram analyzer. Histogram analyzer 56 (FIGS. 6, 10) is executed for a group of weights. The group of weights could be all weights in a layer or channel of the neural network (FIGS. 1-3), or even all weights in the neural network, or all weights in a portion of a layer or sub-channel, or some other grouping of nodes in the neural network.

All of the weights for the channel are extracted, step 502, such as by being read from a memory of the neural network weights. The number of weights for each value of the weight are counted, step 504, to generate a histogram (FIG. 9A), or a dataset representing histogram data or various equivalents.

Each potential interval is processed, step 506. These are intervals of the third shift value, not the first and second shift values. Since the third shift value can have no more than 3 leading one bits, the boundaries of these intervals have no more than 3 one bits.

The interval boundaries are the upper quantized value and the lower quantized value (FIG. 9A). Weight values that are within the interval have additional 1 bits in LSB positions.

These additional 1 bits in the LSB positions are all zeros at the interval boundaries. Weights at the interval boundaries are not included in the calculation of the threshold count, step 504, and in assignment, step 514.

For each potential interval, step 506, the threshold count is calculated, step 504. The threshold count is the quantization threshold with a minimum bias. This can be generated as a weighted average of the weights within this interval. The threshold count is the number of weights assigned to the lower direction. Weights assigned to the lower direction are rounded down to the lower quantized value (FIG. 9B). In step 514, the smallest weights are assigned (rounded down) to the lower direction, the lower quantized value, while the remaining larger weights in the interval are assigned (rounded up) the upper direction, the upper quantized value.

Figure 13:
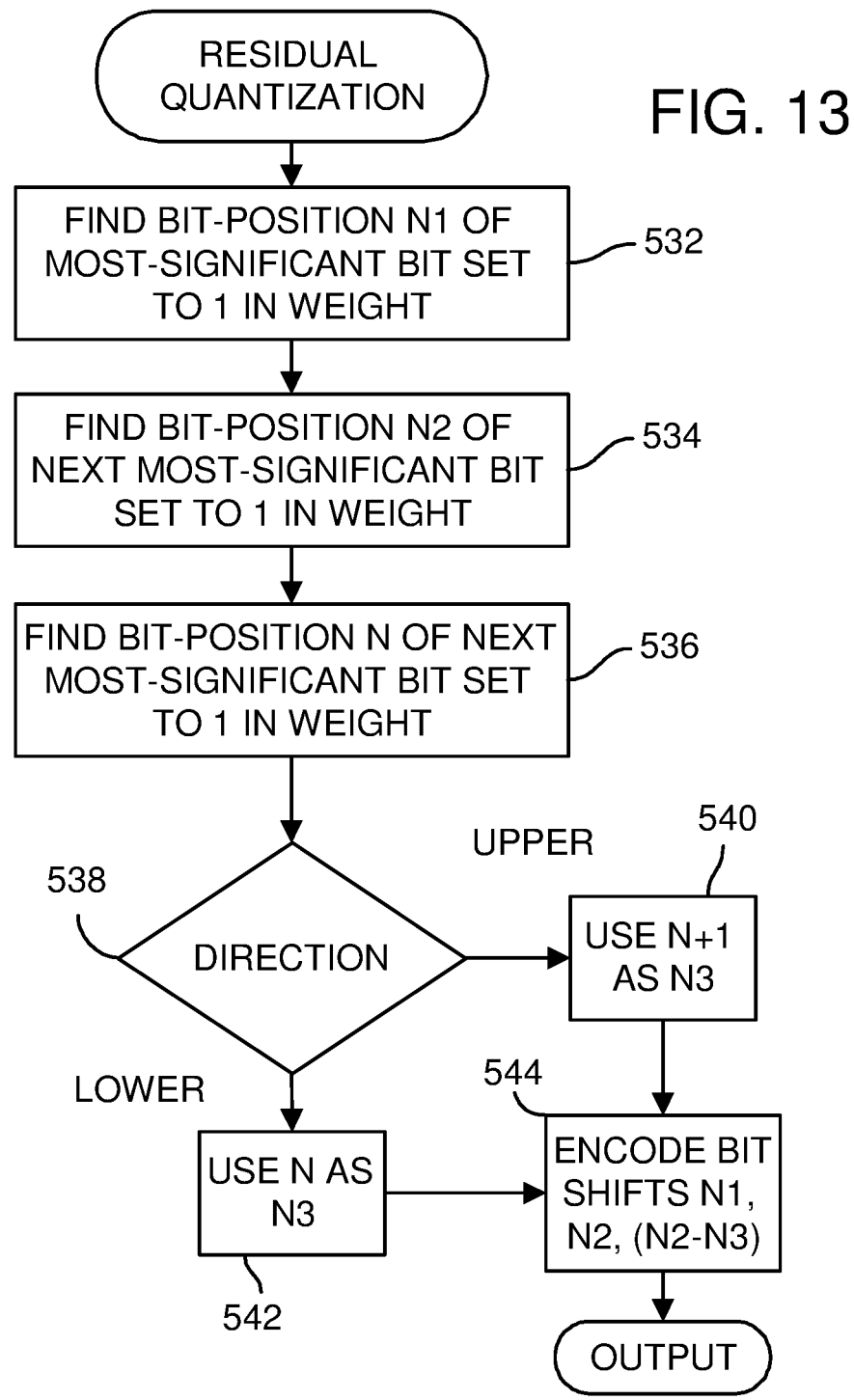
FIG. 13 is a flowchart of residual quantization.

Rather than round the weights up or down during histogram processing, a direction bit can be set to indicate that the weight should be rounded up or down. Then the third bit-shift value is adjusted upward (rounding up) for weights that were assigned to the upper direction (FIG. 13, step 540).

Figure 12:
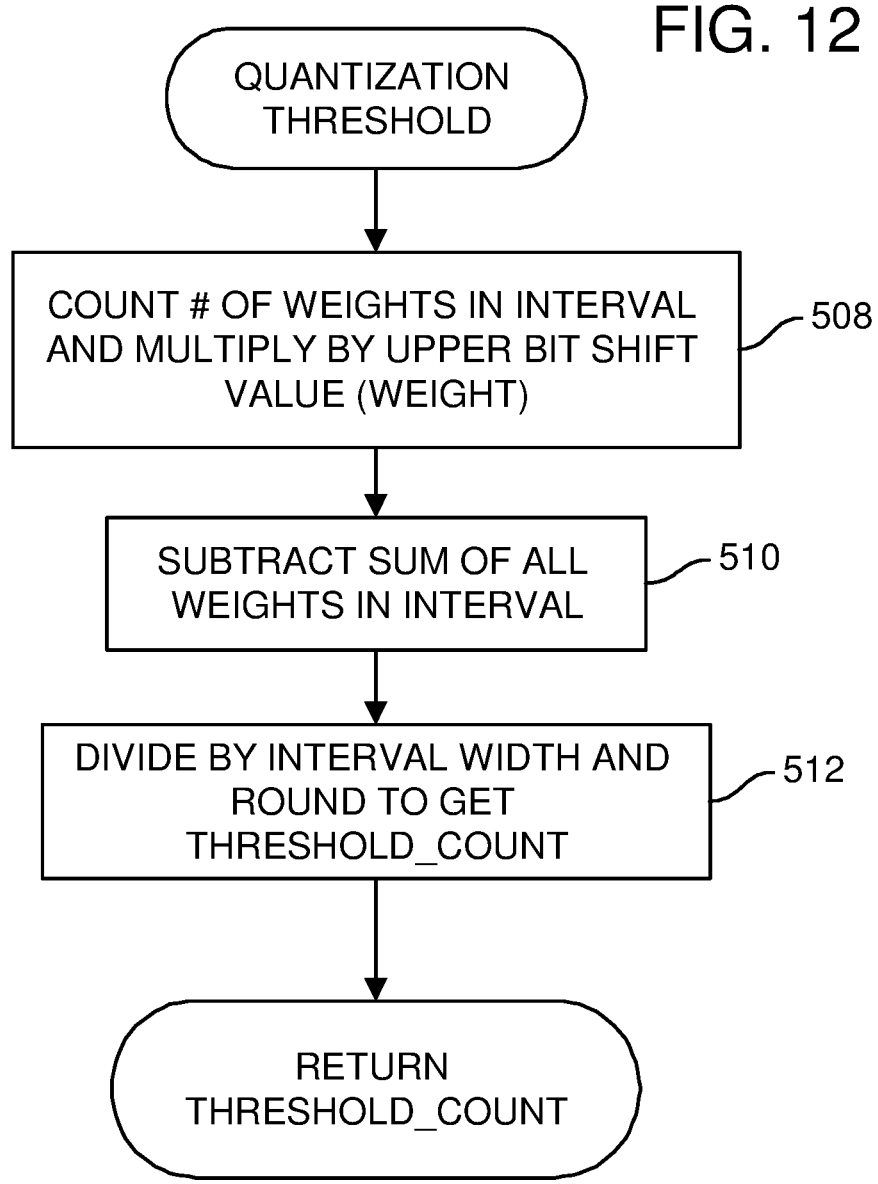
FIG. 12 is a flowchart of calculation of the quantization threshold.

FIG. 12 is a flowchart of calculation of the quantization threshold. The process of FIG. 12 is called when step 504 of FIG. 11 is executed. This process of FIG. 12 returns the threshold count value.

The quantization threshold can be a weighted average of the weights in the interval. The number of weights in this interval are counted and multiplied by the upper quantized value, step 508. Then the sum of all the weights in the interval is subtracted, step 510. The difference is divided by the width of the interval and then rounded to the nearest integer to obtain the threshold count, step 512.

The width of the interval is the width of the interval the upper quantized value minus the lower quantized value.

FIG. 13 is a flowchart of residual quantization. Residual quantizer 50 (FIGS. 6, 10) can perform the process of FIG. 13. The leading 1 in the 16-bit weight is found, step 532. The sign bit is ignored when searching for the leading 1 bit, and when finding other leading 1 bits in the residual weights. The bit position of this leading 1 or MSB 1 bit is bit-position N1.

The next (second) leading 1 bit in the weight is found, step 534. This second leading 1 bit-position is N2. Then the third leading 1 bit position N is found, step 536.

Some weights have only 1 or 2 bits set to 1. Some weights are all zeros. When there are no more leading 1 bits, the bit-position is set to zero, and further searching can be skipped.

When the direction determined by histogram analyzer 56 (FIG. 11) is the upper direction, step 538, then the third leading bit position N is increased by one to N+1, step 540, to generate the absolute third bit-shift value N3. Otherwise, when the lower direction is assigned to this weight, step 538, then the third leading bit position N is used unchanged as the absolute third bit-shift value N3.

The encoded weight is generated, step 544. The encoded weight has the first bit-shift value as N1, the second bit-shift value as N2, and the relative third bit-shift value as N2-N3. N1, N2, and N2-N3 can be encoded as binary values, such as shown in FIG. 7.

When the encoded weight is limited to a 12-bit value, and has a sign bit, there are only 3 binary bits available for the relative third bit-shift value. Three binary bits can only encode values of 0 to 7. When N2-N3 is more than 7, the relative third bit-shift value is set to 7 or to 0, depending on the quantization direction.

Alternate Embodiments

Several other embodiments are contemplated by the inventors. For example, bit shifter 72 can be used in a series of three steps for the three bit-shift values from the encoded weight, with intermediate shift results accumulated into register 76. Alternately, three instances of bit-shifter 72 may be used in parallel, all feeding adder 74 without the need for register 76 to accumulate intermediate results. One instance of bit-shift calculator 70 may be used for each input to the neural network node, with results being sent to node accumulator 78 in parallel, or a single instance of bit-shift calculator 70 may be used repeatedly, for each input to the neural network node, with results being sent to node accumulator 78 in series over time. Other blocks may similarly be implemented in series with less hardware and more delay, or in parallel with more hardware and less delay.

The quantization threshold can be a weighted average of the weights in the interval, or can be another kind of average. The quantization threshold can be obtained with other search algorithms, such as a generic search, to minimize the total bias or to take account of the weights distributions, or to set a target of minimizing quantization error instead of minimizing bias. Other calculations could be used to generate this average and the threshold count. Using a weighted average rather than an arithmetic or geometric average can help reduce quantization biases, especially when the weights have non-uniform distributions.

The hardware costs of the neural network can be reduced by about a third by encoding the weights to require no more than three shift operations, rather than up to 16 shift operations for 16-bit inputs and weights. Cells in the FPGA can be freed up and used to add parallel units to improve speed in critical paths. Bandwidth can be improved. Errors and losses can be reduced and allow for more rapid convergence during training. The reduction in accuracy can be less than 1%, or even less than 0.1%, when encoding the leading three 1 bits in the weights compared with using the full weights.

Different widths and formats of weights, node inputs, and node outputs may be substituted. While encoding up to three leading 1 bits in the weight has been described, the encoded weights could encode just 2 leading 1 bits or 4 or more leading 1 bits, especially for 32-bit weights.

When the weight is all zeros, N1 is zero and can be encoded as all zeros or as all ones. Bit-shift decoder 64 can be designed to detect the all-zero or all-one fields for the first bit-shift value and instruct bit-shift calculator 70 to output zero or to shift by zero bits. Alternately, when the weight is all zeros, normal processing can occur with a zero shift.

Bit-shift encoder 62 and bit-shift decoder 64 could share the same computational hardware, or each could have dedicated hardware. Likewise, for other components. Various combinations of transforms or pre-processing functions may also be substituted. While using FPGA hardware for bit-shift calculator 70 has been described, other hardware architectures and devices could be substituted, such as Application-Specific Integrated Circuit (ASIC) or semi-custom chips.

Some embodiments may not use all components. Additional components may be added. Loss function 42 may use various error/loss and cost generators, such as a weight decay term that prevents weights from growing too large over many cycles of training optimization, a sparsity penalty that encourages nodes to zero their weights, so that only a small fraction of total nodes is effectively in use. The remaining small fraction of nodes is the most relevant. While various loss and cost functions have been described in the theory of operation, many substitutions, combinations, and variations are possible. Other variations and kinds of loss or cost terms can be added to loss function 42. The values of the relative scaling factors for the different cost functions can be adjusted to balance the impact of the various functions.

Floating-point values can be converted to fixed-point values or to binary values. While binary-value weights have been shown, various encodings could be used, such as two's complement, Huffman coding, truncated binary encoding, etc. The number of binary bits required to represent a weight value may refer to the number of bits regardless of the encoding method, whether binary encoding, gray-code encoding, fixed-point, offset, etc.

Weights may be limited to a range of values, such as a range of −1 to 1. The range does not necessarily have to include 0, such as a range of 512 to 1. The weight's value may be offset to fit within a binary range, such as a weight having a range of 10511 to 10000, which could be stored as a 9-bit binary word, with an offset of 10000 added to the binary word to generate the actual weight value. Ranges may be adjusted during optimization. The offset may be stored or may be hardwired into the logic of the neural network.

Weights, inputs, encoded weights, or other values may be inverted, complemented, or otherwise transformed. For example, the bit-shift values could be encoded with active-low rather than active-high bits. Some node may use the encoded weights and be limited to 3 bit shifts, while other nodes may use the original weights without encoding. The neural network may be optimized during training to allow some critical nodes to use the full weights while other less-critical nodes use the encoded weights.

Many variations are possible for training routines that operate the neural network. Optimization may first determine a number of hidden or intermediate levels of nodes, then proceed to optimize weights. The weights may determine an arrangement or connectivity of nodes by zeroing some weights to cut links between nodes. The sparsity cost may be used for initial cycles of optimization when structure is optimized, but not for later cycles of optimization when weight values are being fine-tuned. A sigmoid function may be used for training hidden layers within a deep neural network. Lookup tables may be used for some nodes while more complex functions may use an Arithmetic-Logic-Unit (ALU) to speed up processing. An activation function of each node may be different, for example sigmoid, tan h, and relu.

Different amounts of cost reduction may occur for different applications and training sets. A wide variety of structures with different numbers and arrangements of hidden layers may be used for the neural network. The particular application and process being modeled may suggest certain kinds of neural networks or arrangements for the neural network or a generic neural network may serve as the starting point. a deep neural network may have at least 7 intermediate layers and have at least ten thousand weights.

Autoencoders, automax and softmax classifiers, and other kinds of layers may be inserted into the neural network. The entire optimization process may be repeated several times, such as for different initial conditions, such as for different number of bits to quantize floating point values or other parameters, different precisions, different scaling factors, etc. The endpoint may be set for various combinations of conditions, such as a desired final accuracy, an accuracy-hardware cost product, a target hardware cost, etc.

While the actual cost of the neural network depends on many factors, such as the number of nodes, weights, interconnection, control, and interfaces, the inventors approximate the cost as being proportional to the aggregate of the weights. The total number of binary bits used to represent all weights in the neural network is a measure of the hardware cost, even if only an approximation. Gradients or slopes of the hardware complexity cost gradients may be used. Gradient values may be scaled and otherwise altered before or after comparison.

The neural network, loss function 42, bit-shift calculator 70, residual quantizer 50, histogram analyzer 56, and other components may be implemented in a variety of technologies, using various combinations of software, hardware, firmware, routines, modules, functions, etc. The final product, the neural network with the final weights, can be implemented in an Application-Specific Integrated Circuit (ASIC) or other hardware such as FPGA's to increase processing speed and lower power consumption.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A network system comprising:
 a residual quantizer that receives a weight and encodes a bit-position of a leading 1 bit in the weight as a first bit-shift value, and encodes a bit-position of a second leading 1 bit in the weight as a second bit-shift value,
 a bit-shift encoder that forms an encoded weight from the first bit-shift value and from the second bit-shift value, the bit-shift encoder discarding Least-Significant-Bits (LSBs) in the weight when forming the encoded weight;

a memory for storing the encoded weight, the memory storing a plurality of encoded weights for a plurality of nodes in the neural network;

a bit shifter that receives an input to a node in a neural network and generates a shifted input in response to a shift value;

an accumulator for accumulating the shifted input from the bit shifter to generate an accumulated result; and a bit-shift decoder that reads the encoded weight from the memory and applies the first bit-shift value extracted from the encoded weight to the bit shifter to accumulate a first shifted input into the accumulator, and that applies the second bit-shift value extracted from the encoded weight to the bit shifter to accumulate a second shifted input into the accumulator;

whereby weights are encoded as bit-shift values for leading 1 bits in the weight.

2. The neural network system of claim 1 further comprising:

a node accumulator coupled to receive the accumulated result from the accumulator for all inputs to the node in the neural network to generate a node output for the node.

3. The neural network system of claim 1 wherein the residual quantizer further encodes a bit-position of a third leading 1 bit in the weight as a third bit-shift value;

wherein the bit-shift decoder further applies the third bit-shift value extracted from the encoded weight to the bit shifter to accumulate a third shifted input into the accumulator.

4. The neural network system of claim 3 wherein the bit-shift encoder discards Least-Significant-Bits (LSBs) in the weight having a significance that is less than the third leading 1 bit when forming the encoded weight;

wherein no more than 3 leading 1 bits in the weight are encoded into the encoded weight.

5. The neural network system of claim 3 further comprising:

wherein the third bit-shift value encoded in the encoded weight as a relative shift that is relative to the second bit-shift value;

wherein the first bit-shift value and the second bit-shift value are encoded in the encoded weight as absolute bit-shift values.

6. The neural network system of claim 5 further comprising:

wherein the third bit-shift value has a limited range of the relative shift;

wherein when the relative shift is greater than the limited range, the bit-shift encoder encodes the third bit-shift value as the limited range of the relative shift, whereby the third bit-shift value is limited in range.

7. The neural network system of claim 5 wherein the weight is a 16-bit value;

wherein the encoded weight is a 12-bit value;

wherein memory space required to store the plurality of encoded weights is 25% less than memory space required to store a plurality of weights without encoding.

8. The neural network system of claim 7 wherein the input to the node is a 16-bit value.

9. The neural network system of claim 3 further comprising:

a histogram analyzer that receives all weights in an interval between an upper quantized weight and a lower quantized weight and generates a direction indicator for each weight in the interval, the direction indicator indicating an upper direction or a lower direction for the weight; and a residual quantizer that increments the third bit-shift value for a weight when the direction indicator indicates the upper direction for the weight;

whereby the third bit-shift value is incremented for weights having the direction indicator indicating the upper direction.

10. The neural network system of claim 9 wherein the histogram analyzer generates a weighted average of all weights in the interval, the histogram analyzer setting the direction indicator to indicate the upper direction for all weights in the interval above the weighted average, the histogram analyzer setting the direction indicator to indicate the lower direction for all weights in the interval below the weighted average.

11. The neural network system of claim 1 wherein the bit shifter and the accumulator are implemented as a Look-Up Table (LUT) without using a Multiply-Accumulator (MAC) digital-signal processor (DSP) block.

12. The neural network system of claim 1 wherein the bit shifter and the accumulator are implemented in a Field-Programmable Gate Array (FPGA).

13. A neural network accelerator system stem comprising:

an encoded weight input for receiving an encoded weight for an input to a node in a neural network;

a bit-shift decoder, receiving the encoded weight from the encoded weight input, the bit-shift decoder outputting a first bit-shift value and a second bit-shift value;

a first bit shifter that receives an input to the node in the neural network, the first bit shifter generating a first shifted input by shifting the input by a number of bit positions indicated by the first bit-shift value;

a second bit shifter that receives the input to the node in the neural network, the second bit shifter generating a second shifted input by shifting the input by a number of bit positions indicated by the second bit-shift value; and an adder that adds the first shifted input to the second shifted input to generate a result of multiplying the input with the encoded weight.

14. The neural network accelerator system of claim 13 further comprising:

one or more instances of a Look-Up Table (LUT) for operating as the first bit shifter, the second bit shifter, and the adder.

15. The neural network accelerator system of claim 13 wherein the bit-shift decoder further outputs a third bit-shift value for the encoded weight;

further comprising:

a third bit shifter that receives the input to the node in the neural network, the third bit shifter generating a third shifted input by shifting the input by a number of bit positions indicated by the third bit-shift value;

wherein the adder also adds the third bit-shift value to the first shifted input and to the second shifted input to generate the result of multiplying the input with the encoded weight.

16. The neural network accelerator system of claim 15 wherein the first bit shifter, the second bit shifter, the third bit shifter, and the adder are implemented as one or more Look-Up Tables (LUTs) on a Field-Programmable Gate Array (FPGA).

17. The neural network accelerator system of claim 15 wherein the first bit shifter, the second bit shifter, the third bit shifter are parallel blocks able to operate simultaneously.

18. The neural network accelerator system of claim 15 wherein the first bit shifter, the second bit shifter, the third bit shifter are implemented by a same block, wherein the first bit shifter, the second bit shifter, and the third bit shifter operate in series.

19. A neural network system comprising:
a weight quantizer that receives a weight for a node in a neural network and generates a first bit-shift value indicating a position of a leading 1 bit in the weight and generates a second bit-shift value indicating a position of a second leading 1 bit in the weight;
a residual quantizer that generates a third bit-shift value indicating a position of a third leading 1 bit in the weight;
a histogram analyzer that receives a plurality of weights for an interval between an upper quantized weight and a lower quantized weight;
wherein the upper quantized weight and the lower quantized weight each have all 0 bits for all bit positions of less significance than the position of the third leading 1 bit in the weight;
the histogram analyzer generating a weighted average of the plurality of weights for the interval, and activating an upper directional bit for all weights in the interval that are greater than the weighted average;
the residual quantizer incrementing the third bit-shift value for weights having the upper directional bit set;
a bit-shift encoder that encodes the first bit-shift value, the second bit-shift value, and the third bit-shift value to form an encoded weight, the bit-shift encoder not including in the encoded weight all bit positions of less significance than the position of the third leading 1 bit in the weight;
a bit shifter that shifts an input to the node by the first bit-shift value to generate a first shifted input, and that shifts the input to the node by the second bit-shift value to generate a second shifted input, and that shifts the input to the node by the third bit-shift value to generate a third shifted input; and
an adder that adds together the first shifted input, the second shifted input, and the third shifted input to generate a result;
wherein the result is an approximation of an exact result of multiplying the input to the node by the weight for the node.

20. The neural network system of claim 19 further comprising:
a memory for storing a plurality of the encoded weight for a plurality of nodes in the neural network;
wherein the neural network comprises a plurality of the bit shifter and a plurality of the adder for the plurality of nodes in the neural network.

* * * * *